US010239423B2

(12) United States Patent
Aktas

(10) Patent No.: US 10,239,423 B2
(45) Date of Patent: Mar. 26, 2019

(54) TIP AND SLIDE SYSTEM FOR A VEHICLE SEAT

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/820,510

(22) Filed: Nov. 22, 2017

(65) Prior Publication Data

US 2018/0105077 A1 Apr. 19, 2018

Related U.S. Application Data

(63) Continuation of application No. 15/211,696, filed on Jul. 15, 2016, now Pat. No. 9,868,369.

(51) Int. Cl.
*B60N 2/20* (2006.01)
*B60N 2/22* (2006.01)
*B60N 2/12* (2006.01)

(52) U.S. Cl.
CPC .......... *B60N 2/12* (2013.01); *B60N 2002/126* (2013.01)

(58) Field of Classification Search
CPC ............... B60N 2/20; B60N 2/22; B60N 2/08
USPC ........................... 397/344.11, 378.12, 378.14
See application file for complete search history.

(56) References Cited

U.S. PATENT DOCUMENTS

| | | | |
|---|---|---|---|
| 4,607,884 A | 8/1986 | Heling | |
| 4,756,577 A | 7/1988 | Berg et al. | |
| 5,695,247 A | 12/1997 | Premji | |
| 5,707,111 A | 1/1998 | Kim | |
| 5,707,112 A | 1/1998 | Zinn | |
| 6,152,533 A | 11/2000 | Smuk | |
| 6,336,679 B1 | 1/2002 | Smuk | |
| 6,827,404 B2 | 12/2004 | Blair et al. | |
| 6,926,362 B2 | 8/2005 | Kroner et al. | |
| 6,926,364 B2 | 8/2005 | Cooley et al. | |
| 6,983,993 B2 | 1/2006 | Hahn | |
| 7,017,995 B2 | 3/2006 | De Nichilo | |
| 7,025,422 B2 | 4/2006 | Fast | |
| 7,086,698 B2 | 8/2006 | Shiraki | |
| 7,344,189 B2 | 3/2008 | Reed et al. | |
| 7,434,883 B2 | 10/2008 | Deptolla | |
| 7,533,937 B2 | 5/2009 | Becker et al. | |
| 7,740,316 B2 | 6/2010 | Beneker et al. | |
| 7,819,479 B2 | 10/2010 | Halbig et al. | |
| 7,823,977 B2 | 11/2010 | Wieclawski | |
| 7,837,268 B2 | 11/2010 | Becker et al. | |
| 7,922,251 B2 | 4/2011 | Hayakawa et al. | |
| 8,002,355 B2 | 8/2011 | Kumazaki et al. | |
| 8,033,608 B2 | 10/2011 | Yoshida et al. | |
| 8,109,574 B2 | 2/2012 | Becker et al. | |
| 8,167,372 B2 | 5/2012 | Hazlewood | |

(Continued)

*Primary Examiner* — Rodney B White
(74) *Attorney, Agent, or Firm* — Vichit Chea; Price Heneveld LLP

(57) ABSTRACT

A vehicle seat includes a seatback pivot rotationally operable relative to a slidable base, a first cam in communication with the seatback pivot to activate a track-overslide actuator of the base when the seatback pivot is in a rear-entry position and a second cam in communication with the seatback pivot. When the track-overslide actuator is activated, forward operation of the base locks the seatback pivot in the rear-entry position.

19 Claims, 17 Drawing Sheets

(56) References Cited

U.S. PATENT DOCUMENTS

| | | |
|---|---|---|
| 8,585,145 B2 | 11/2013 | Nock et al. |
| 8,662,578 B2 | 3/2014 | Szybisty et al. |
| 8,662,589 B2 | 3/2014 | Suzuki et al. |
| 8,690,251 B2 | 4/2014 | Miller et al. |
| 8,714,649 B2 | 5/2014 | Assmann |
| 8,757,719 B2 | 6/2014 | Hayakawa |
| 8,777,316 B2 | 7/2014 | Shanmugam et al. |
| 8,985,691 B2 | 3/2015 | Tsuruta et al. |
| 9,033,419 B2 | 5/2015 | Thiel |
| 9,487,113 B2 | 11/2016 | Schukalski |
| 9,649,956 B2 | 5/2017 | Lehmann et al. |
| 9,868,369 B1 * | 1/2018 | Aktas ................. B60N 2/20 |
| 2003/0080601 A1 | 5/2003 | Charras et al. |
| 2004/0036339 A1 | 2/2004 | Christoffel et al. |
| 2004/0262969 A1 | 12/2004 | Sasaki et al. |
| 2010/0207440 A1 | 8/2010 | Hayakawa et al. |
| 2012/0261964 A1 | 10/2012 | Yamaguchi et al. |

* cited by examiner

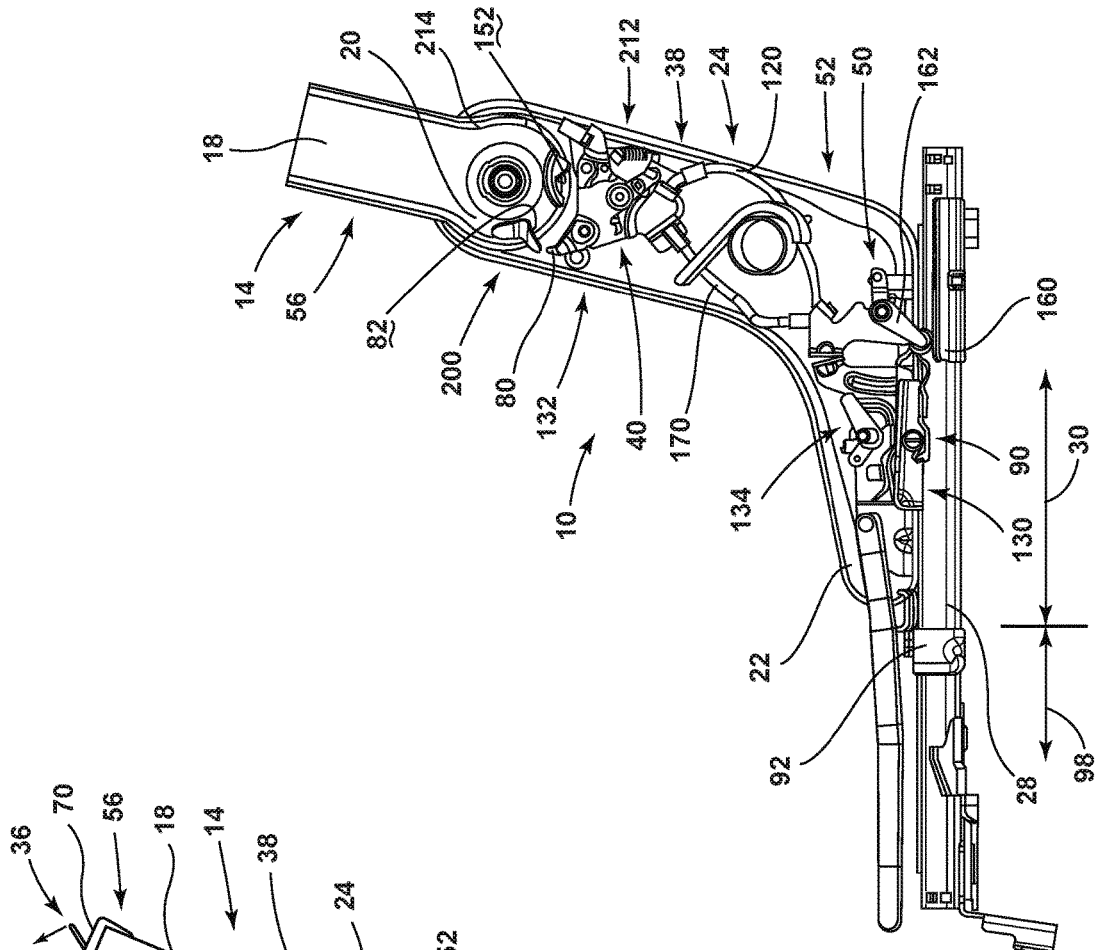
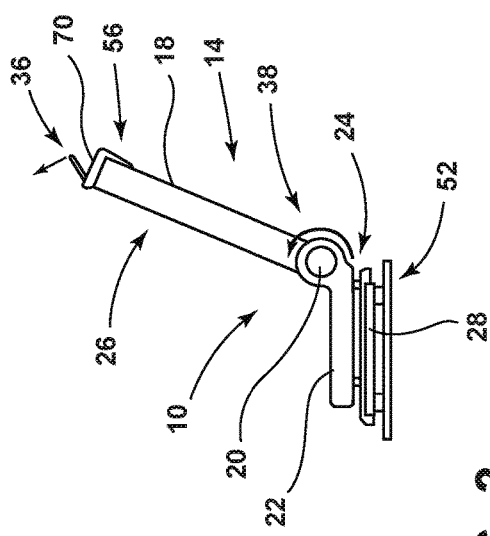
FIG. 3
FIG. 4

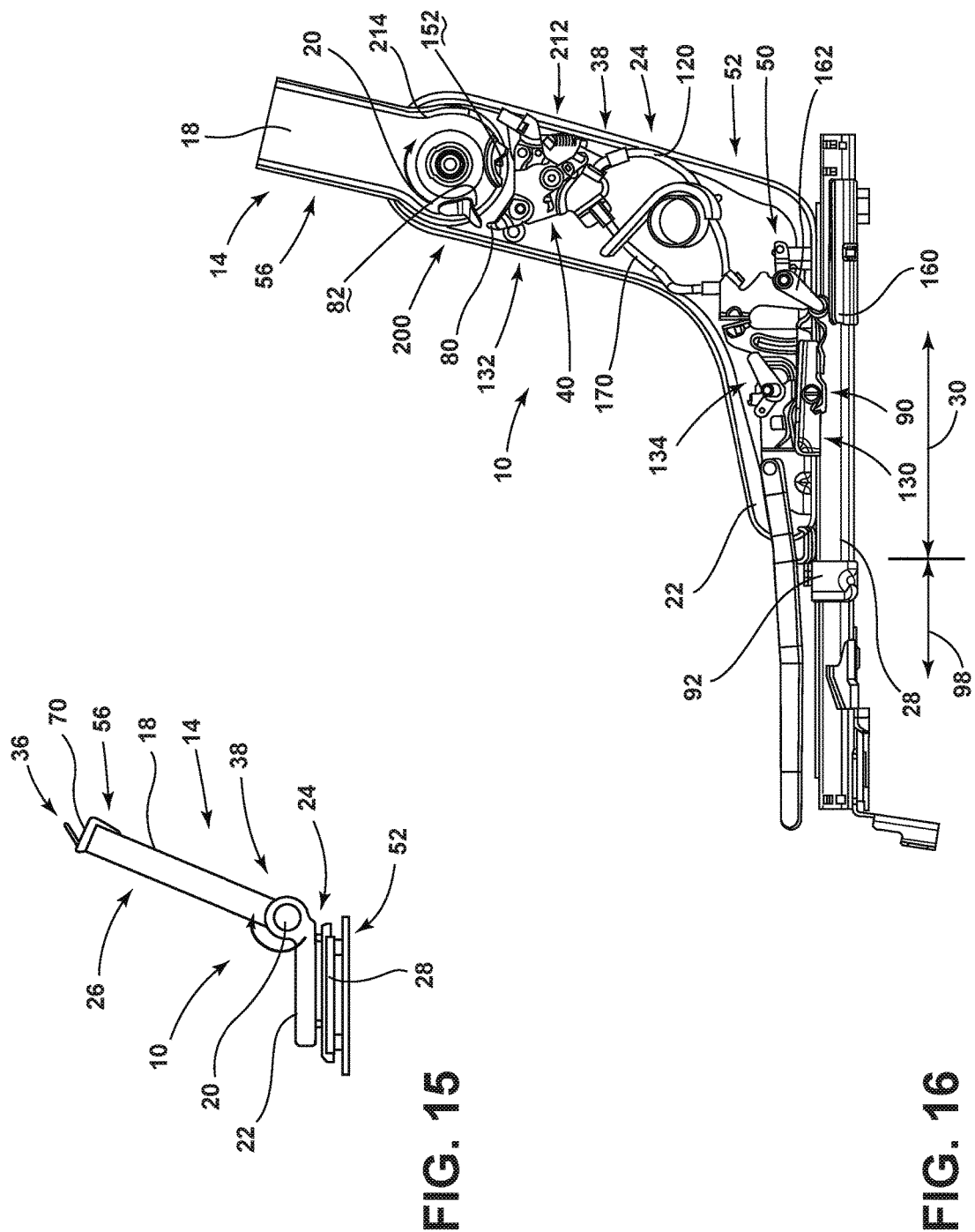

TIP AND SLIDE SYSTEM FOR A VEHICLE SEAT

CROSS-REFERENCE TO RELATED APPLICATION

The present application is a continuation of U.S. patent application Ser. No. 15/211,696 filed Jul. 15, 2016, entitled TIP AND SLIDE SYSTEM FOR A VEHICLE SEAT, now U.S. Pat. No. 9,868,369, the entire disclosure of which is hereby incorporated herein by reference.

FIELD OF THE INVENTION

The present invention generally relates to vehicle seats, and more specifically, to an at least partially collapsible vehicle seat for providing access to a rear portion of a passenger compartment.

BACKGROUND OF THE INVENTION

Various automobiles include multiple seating areas within a passenger compartment. Certain portions of the passenger compartment do not have an exterior door that directly serves that portion of the passenger compartment, such as a third row seating area, or a second row seating area in certain two-door vehicles. To access these areas, certain vehicle seats need to be able to move forward to allow for access to these rear portions of the passenger cabin. Typically, these seats perform a combination of tilting and sliding operations to provide such access.

SUMMARY OF THE INVENTION

According to one aspect of the present invention, a vehicle seat includes a seatback having a seatback pivot rotationally coupled to a base at a rear-access assembly. The seatback is selectively operable about the seatback pivot between a plurality of rotational positions and the base is slidable along a track at least between a plurality of comfort positions. A rear-access lever is in communication with the seatback pivot and the rear-access assembly, wherein operation of the rear-access lever to an engaged state places the rear-access assembly in a ready position that at least partially obstructs the rotation of the seatback pivot. A track overslide actuator of the rear-access assembly is in communication with the seatback pivot and the track, wherein after the rear-access assembly is in the ready position, operation of the seatback pivot to a rear-entry position activates the track overslide actuator to provide slidable forward operation of the base along the track beyond the plurality of comfort positions. An interlock actuator of the rear-access assembly is in communication with the seatback pivot and the track, wherein when the track overslide actuator is activated, forward operation of the base along the track from a home position activates the interlock actuator into a blocking position to lock the seatback pivot and the seatback in the rear-entry position. Rearward sliding movement of the base back to the home position disengages the interlock actuator from the blocking position and movement of the seatback pivot to an upright position disengages the track overslide actuator.

According to another aspect of the present invention, a vehicle seat includes a seatback pivot rotationally operable relative to a slidable base. A first cam is in communication with the seatback pivot to activate a track-overslide actuator of the base when the seatback pivot is in a rear-entry position. A second cam is in communication with the seatback pivot. When the track-overslide actuator is activated, forward operation of the base locks the seatback pivot in the rear-entry position.

According to another aspect of the present invention, a pivot assembly for a vehicle seat includes a seatback pivot in communication with a seat-base slide, wherein rotation of the seatback pivot to a rear-entry position selectively activates an overslide cam to define an overslide state of the seat-base slide. Forward translation of the seatback pivot in the rear-entry position relative to the seat-base slide activates an interlock cam that retains the seatback pivot in the rear-entry position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a schematic side elevational view of a vehicle seat incorporating an aspect of the tilt and slide mechanism;

FIG. 4 is a partial elevational view of a seat structure incorporating the tilt and slide mechanism;

FIG. 15 is a schematic elevational view of the seat of FIG. 12 showing the seatback being moved to an upright position;

FIG. 16 is a partial elevational view of the seat frame of FIG. 14 showing the seatback moving to the upright position;

DETAILED DESCRIPTION OF THE PREFERRED EMBODIMENTS

Figure 1:
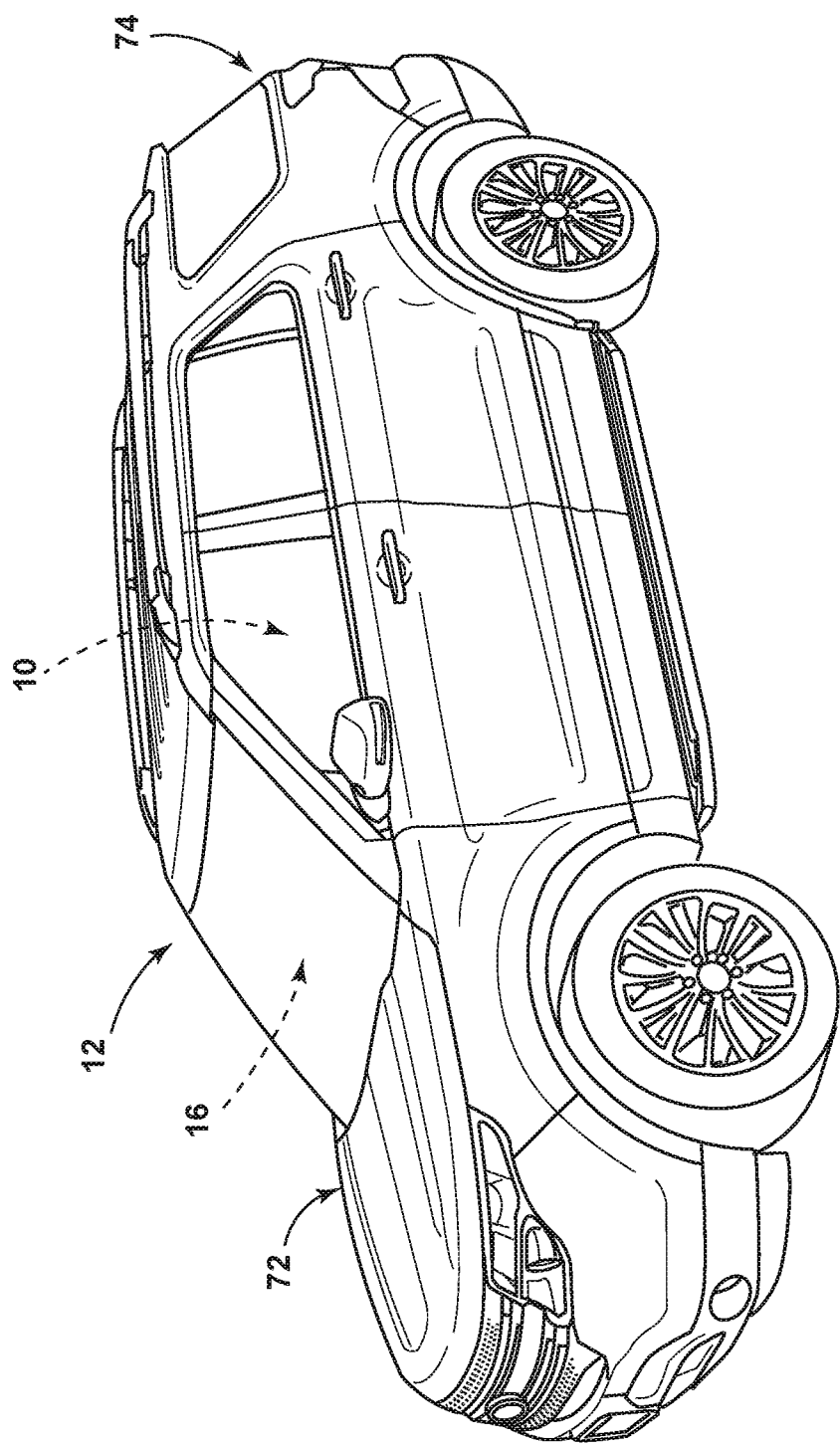
FIG. 1 is a side perspective view of a vehicle having seats that incorporate an aspect of the tilt and slide mechanism incorporated therein.
Figure 2:
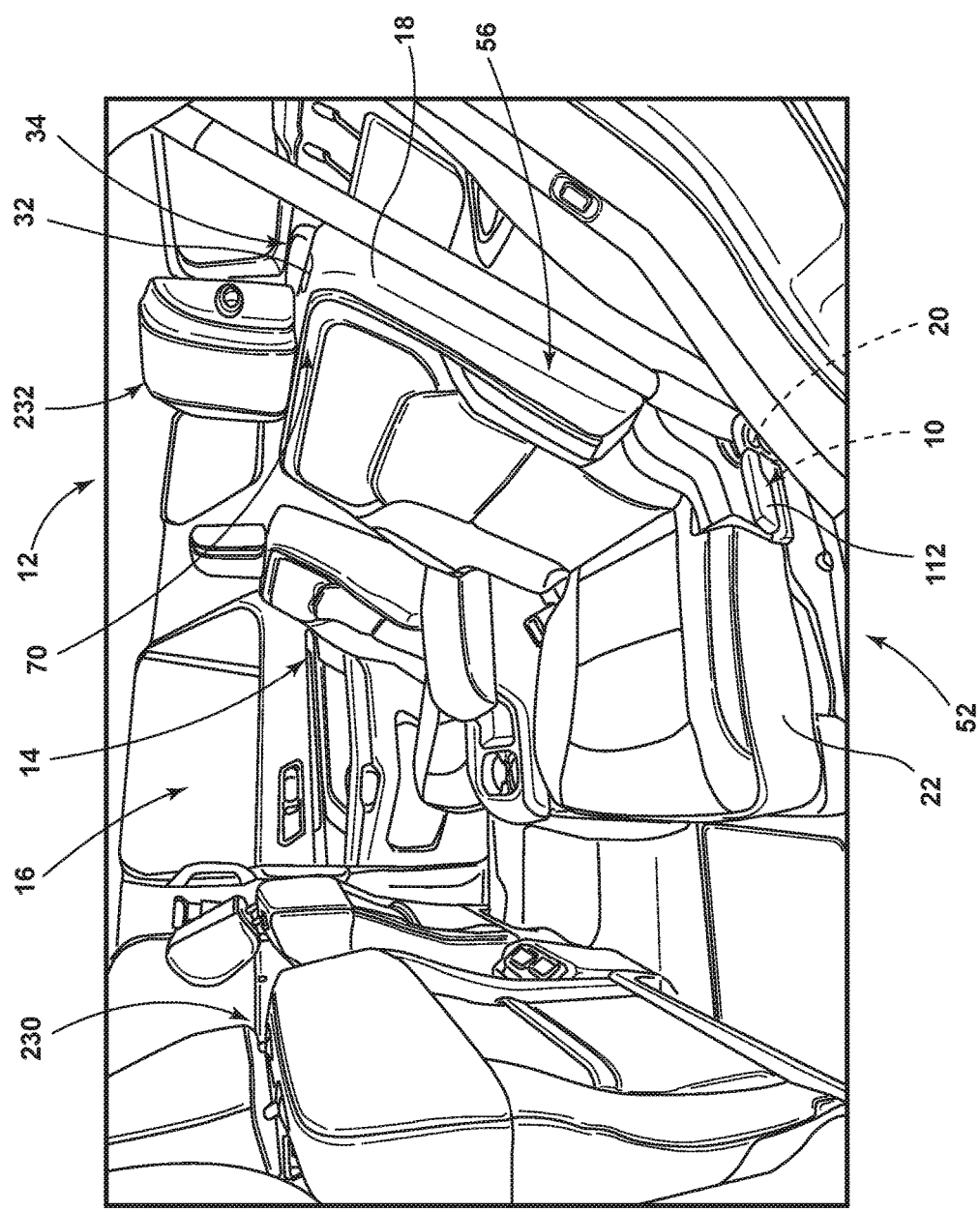
FIG. 2 is a perspective view of a second row of seating within a passenger compartment of FIG. 1.
Figure 5:
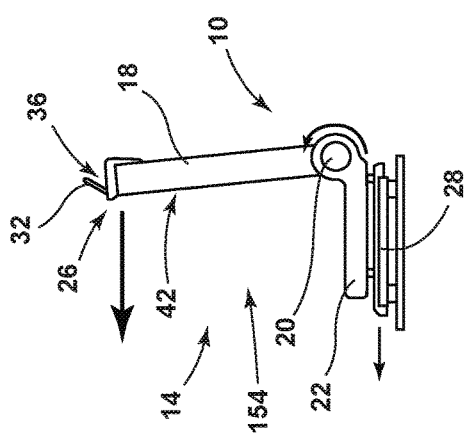
FIG. 5 is a schematic representation of the vehicle seat of FIG. 3 with the seatback tilted forward to a rear-entry position.
Figure 6:
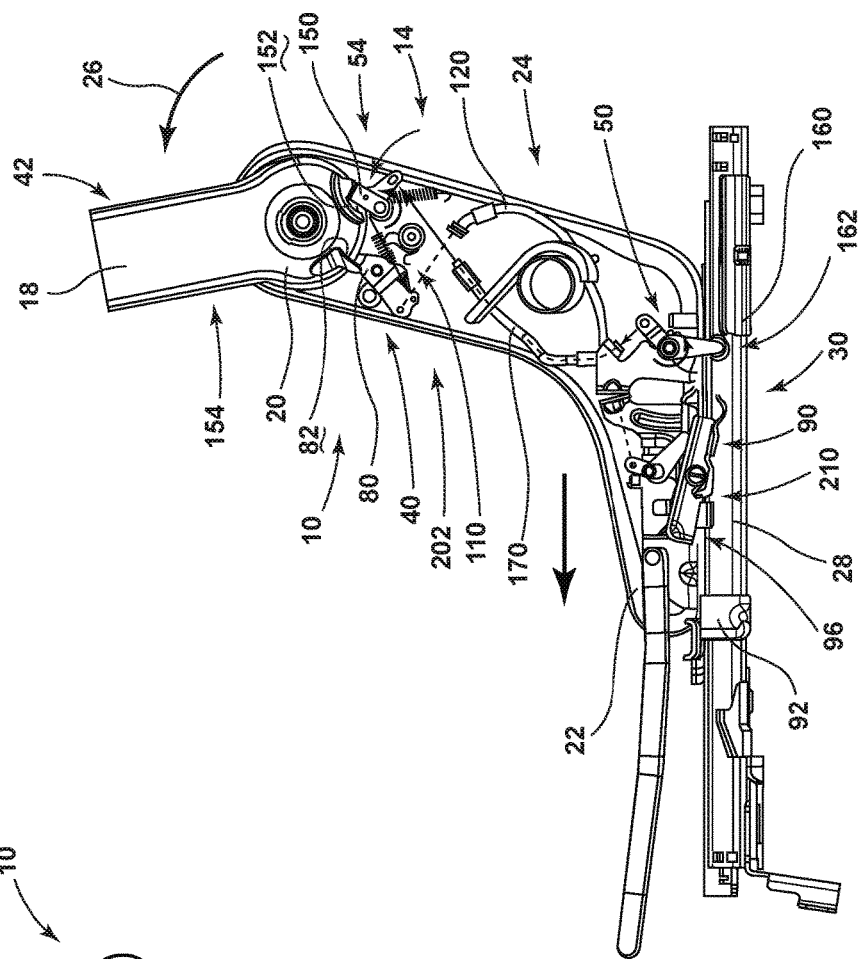
FIG. 6 is a partial elevational view of the seat frame of FIG. 4 showing the seatback moved to the rear-entry position.
Figure 7:
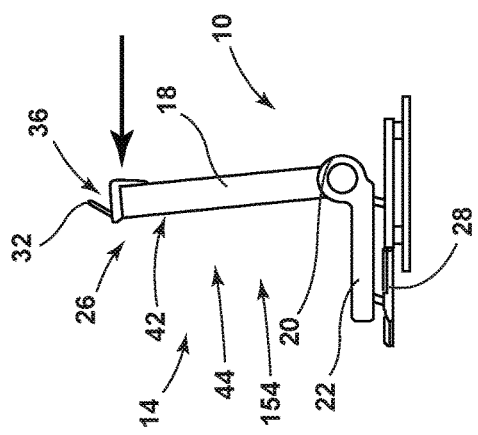
FIG. 7 is a schematic elevational view of the seatback of FIG. 5 with the seat moved to a forward-most comfort position.
Figure 8:
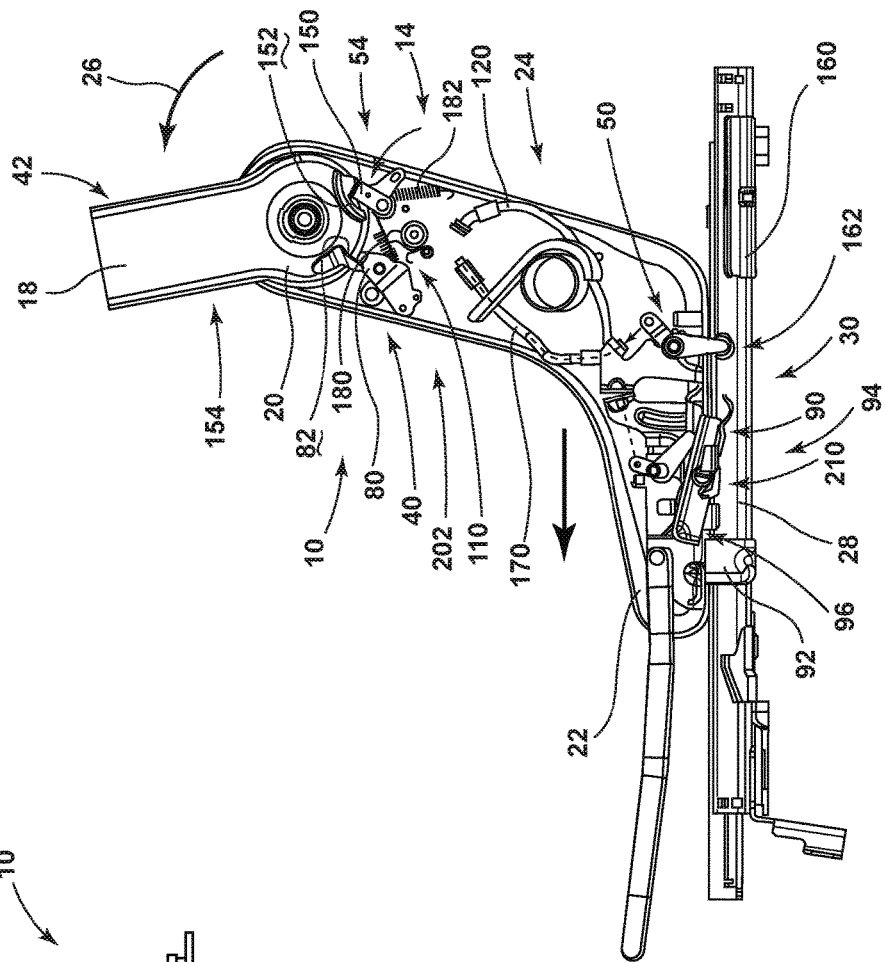
FIG. 8 is a partial elevational view of the seat frame of FIG. 6 with the seat moved forward to the forward-most comfort position.
Figure 9:
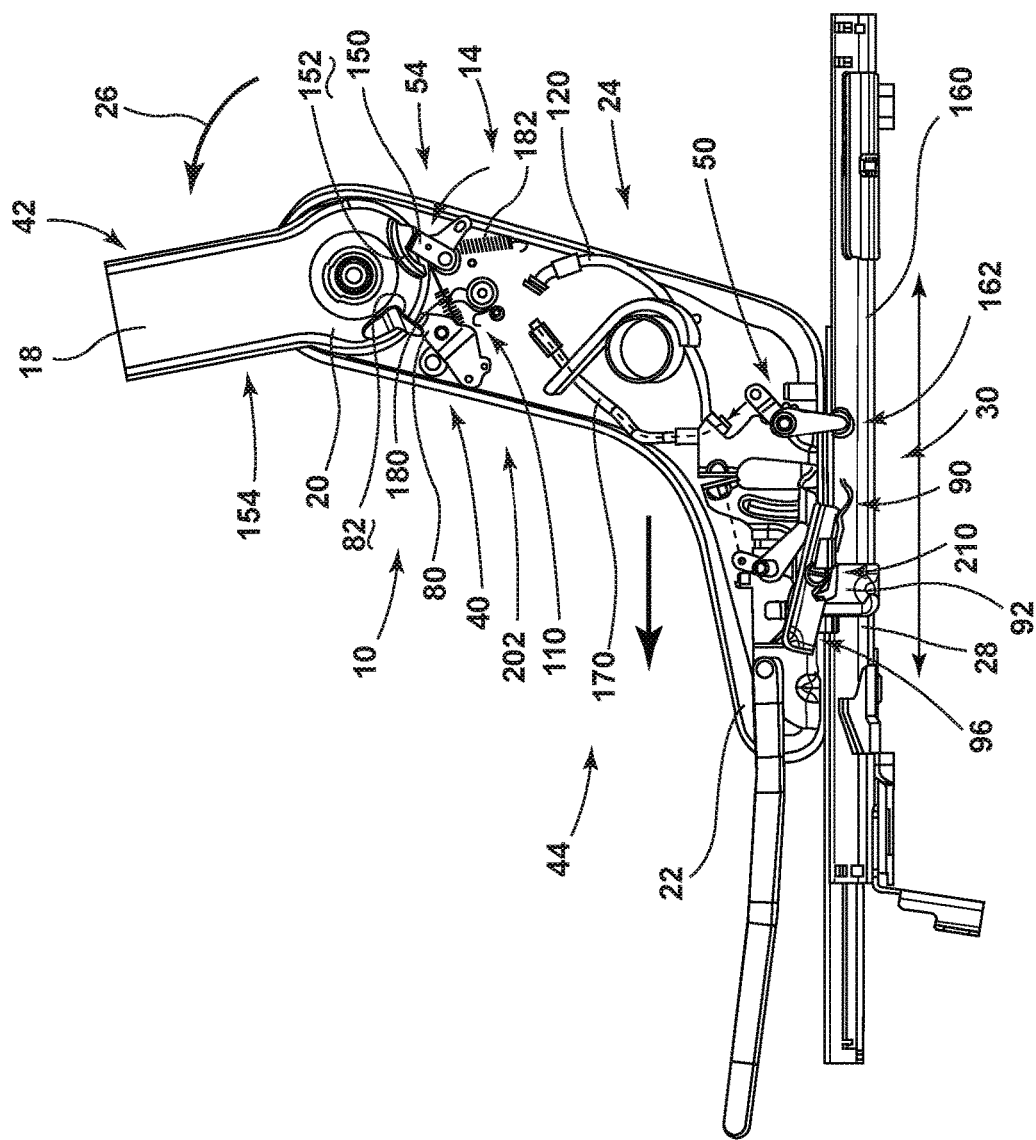
FIG. 9 is a partial elevational view of the seat frame of FIG. 8 with the seat moving past the forward-most comfort position to a non-seating position.
Figure 10:
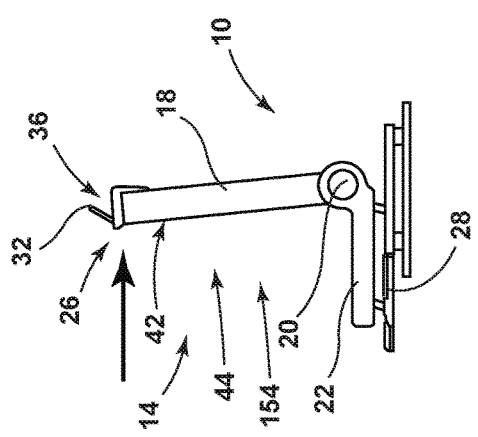
FIG. 10 is a schematic elevational view of the seatback of FIG. 7 showing the seat moving rearward toward the forward-most comfort position.
Figure 11:
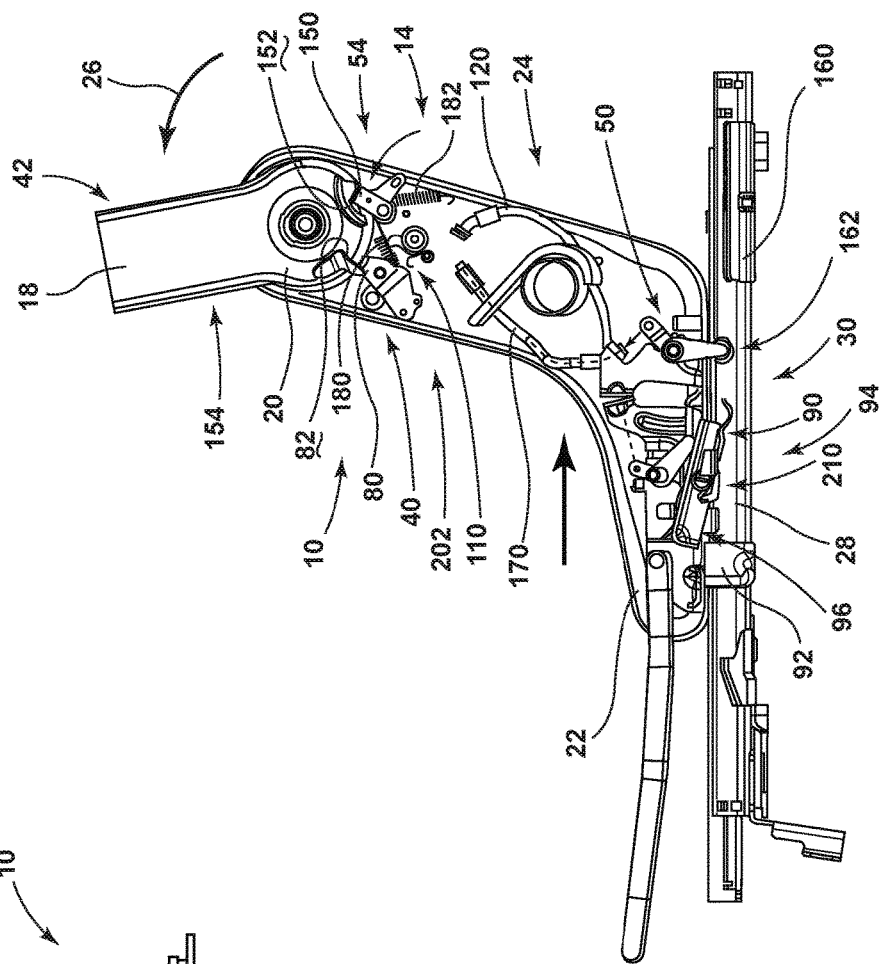
FIG. 11 is a partial elevational view of the seat frame of FIG. 9 showing the seat moving rearward back to the forward-most comfort position.
Figure 12:
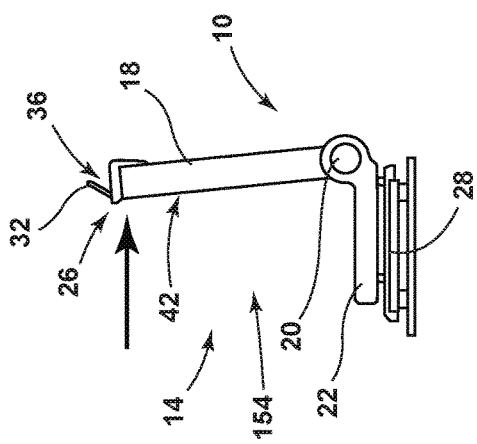
FIG. 12 is a schematic elevational view of the seat of FIG. 10 showing the seat moving toward a home position.
Figure 13:
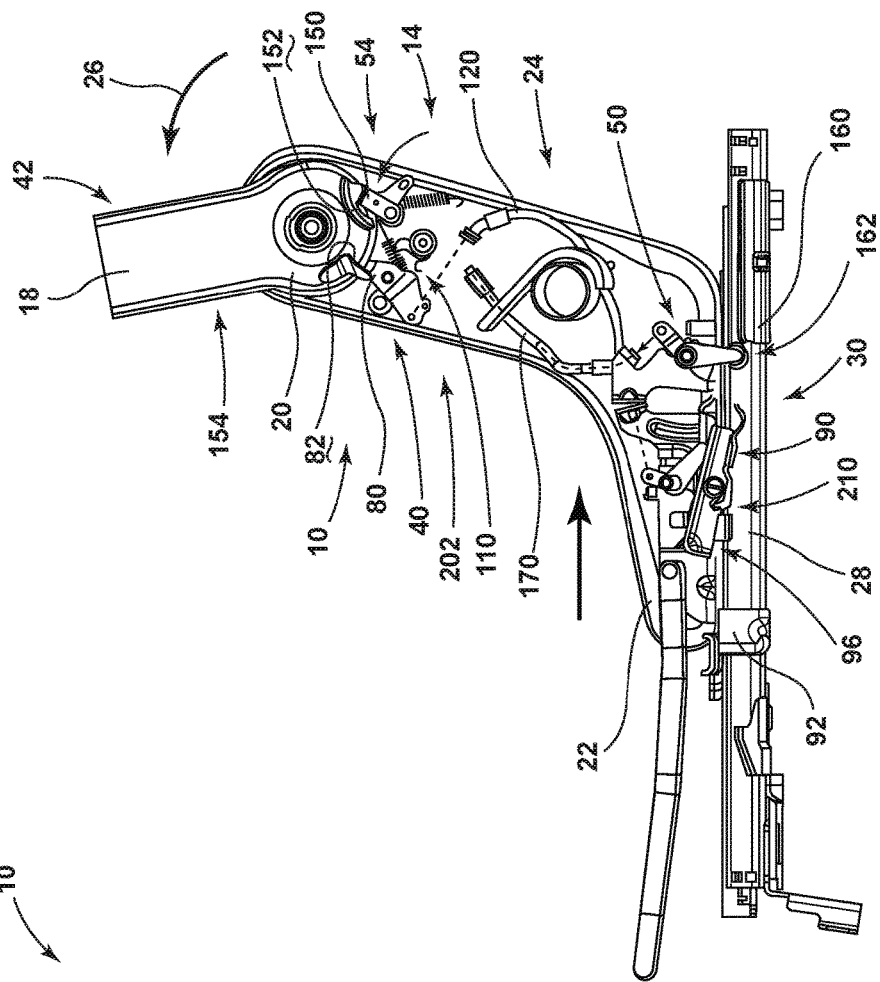
FIG. 13 is a partial elevational view of the seat frame of FIG. 11 showing the seat frame moving toward the home position.
Figure 14:
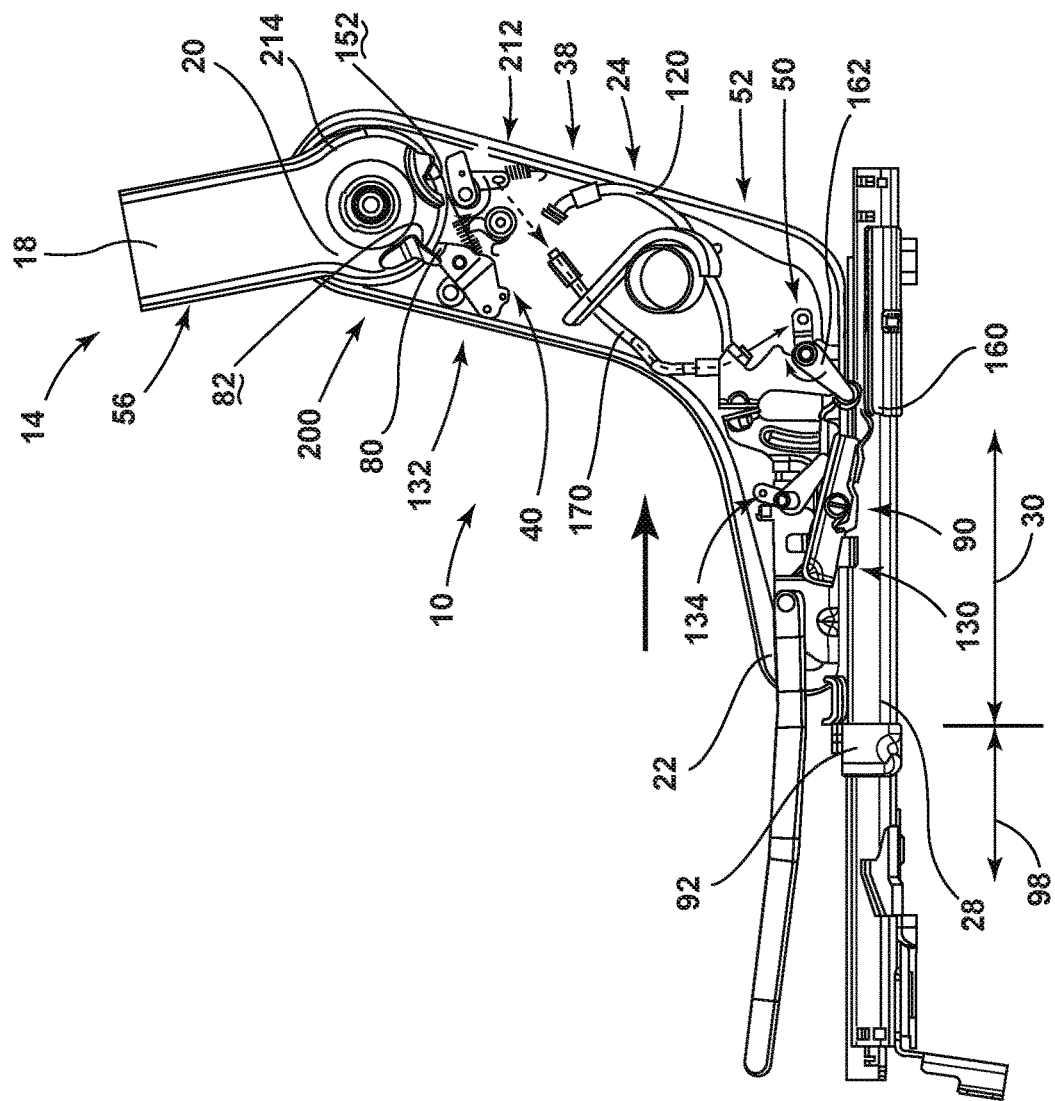
FIG. 14 is a partial elevational view of the seat frame of FIG. 13 showing the seat in the home position.
Figure 17:
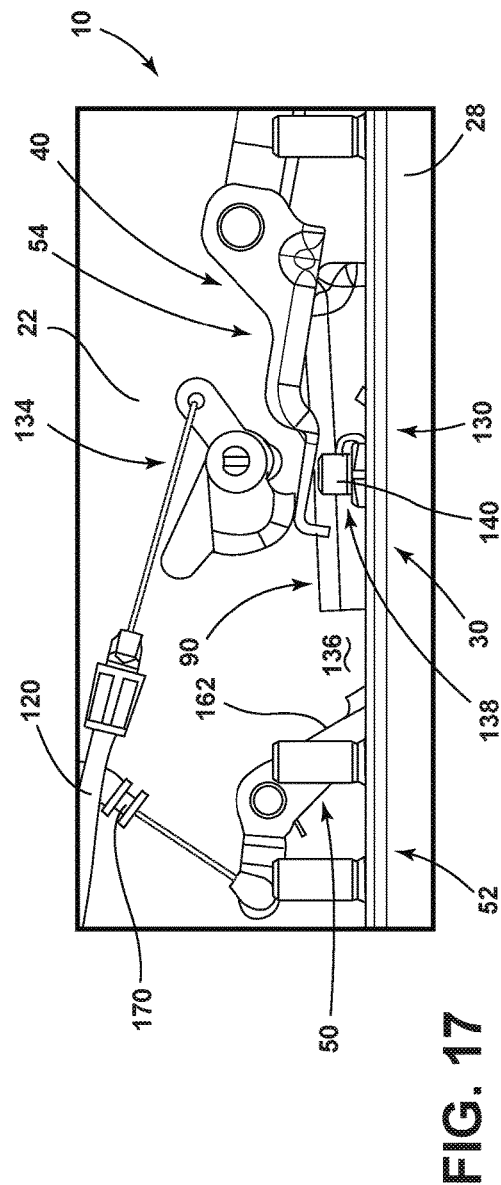
FIG. 17 is an enlarged elevational view of an aspect of the track overslide actuator of the seat frame showing the track overslide actuator in a deactivated state.
Figure 18:
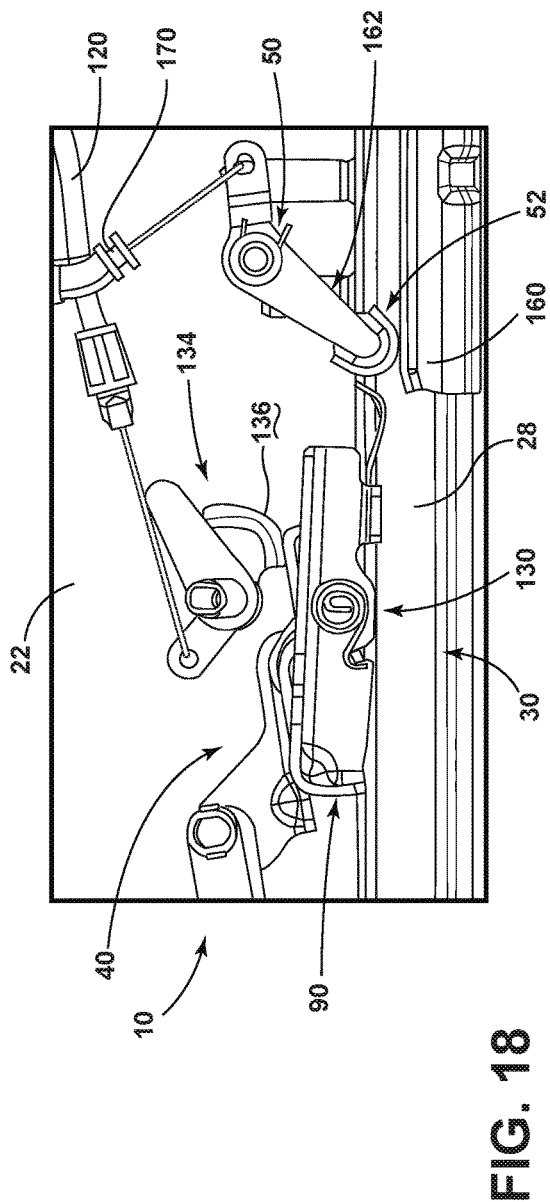
FIG. 18 is an enlarged elevational view of the track overslide actuator of FIG. 17 taken from an opposing elevation.
Figure 19:
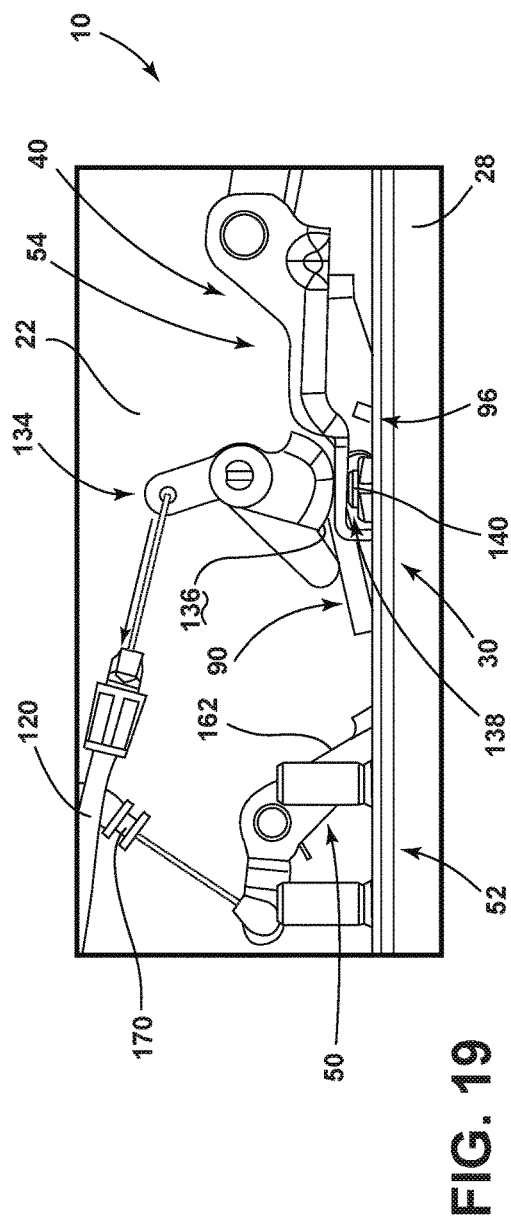
FIG. 19 is an enlarged elevational view of the track overslide actuator of FIG. 17 showing the track overslide actuator in an activated state.
Figure 20:
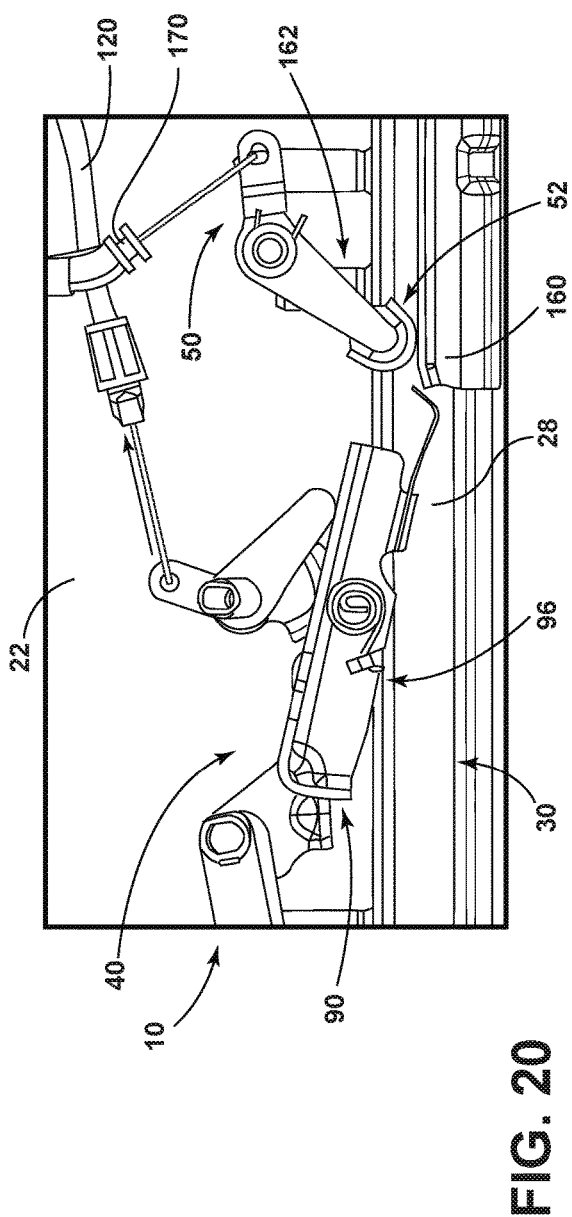
FIG. 20 is an enlarged elevational view of the track overslide actuator of FIG. 19 taken from an opposing elevational view.
Figure 21:
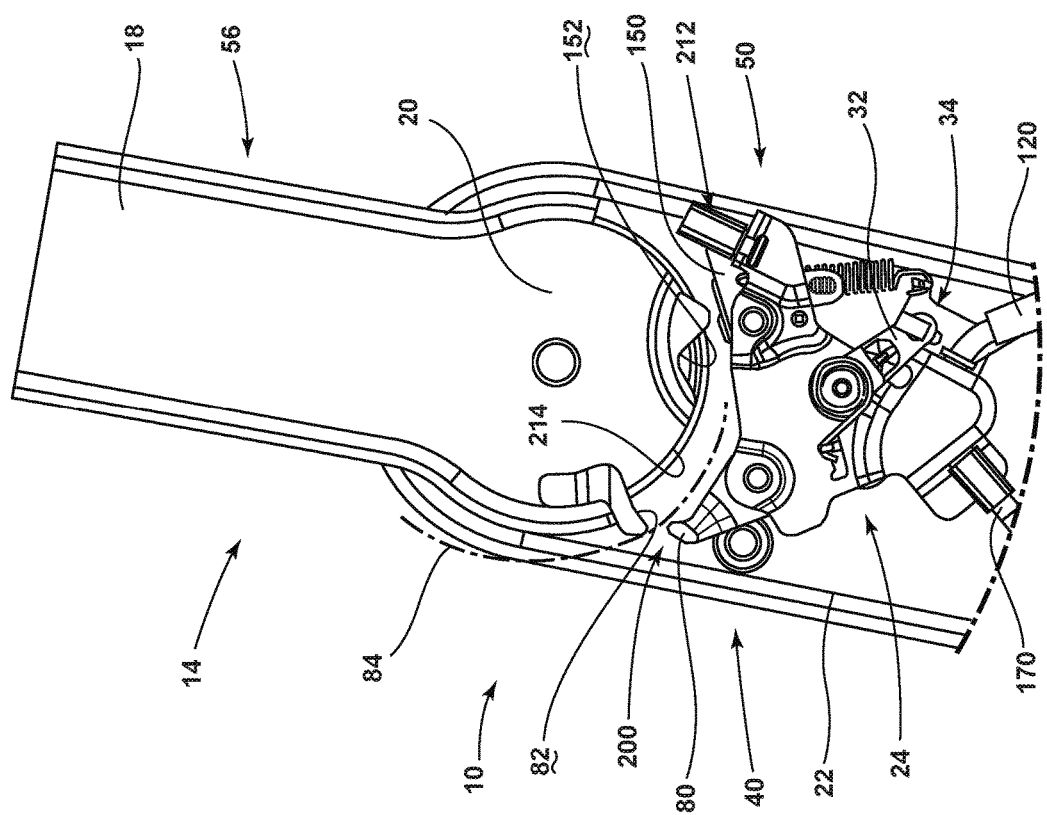
FIG. 21 is an enlarged elevational view of the seatback pivot with the seatback in an upright position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-17, reference numeral 10 generally refers to a tilt and slide mechanism for a vehicle 12 incorporated within a vehicle seat 14 for allowing access to rear portions of a passenger cabin 16 of the vehicle 12. The vehicle seat 14 includes a seatback 18 having a seatback pivot 20 that is rotationally coupled to a base 22 at a rear-access assembly 24. The seatback 18 is selectively operable about the seatback pivot 20 between a plurality of rotational positions 26. The base 22 is also slidable along a track 28 at least between a plurality of comfort positions 30. A rear-access lever 32 is disposed in communication with the seatback pivot 20 and the rear-access assembly 24. Operation of the rear-access lever 32 from an idle state 34 to an engaged state 36 places the rear-access assembly 24 in a ready position 38. It is contemplated that the ready position 38 at least partially obstructs the rotation of the seatback pivot 20 from defining the plurality of rotational positions 26 of the seatback 18. A track overslide actuator 40 of the rear-access assembly 24 is disposed in communication with the seatback pivot 20 and the track 28. It is contemplated that after the rear-access assembly 24 is placed in the ready position 38 through operation of the rear-access lever 32, operation of the seatback pivot 20 to a rear-entry position 42 serves to activate the track overslide actuator 40. Activation of the track overslide actuator 40, in turn, serves to provide slidable forward operation of the base 22 along the track 28 and beyond the plurality of comfort positions 30 to a rear-access position 44. An interlock actuator 50 of the rear-access assembly 24 is disposed in communication with the seatback pivot 20 and the track 28. When the track overslide actuator 40 is activated, forward operation of the base 22 along the track 28 from a home position 52 activates the interlock actuator 50 into a blocking position 54. The blocking position 54 of the interlock actuator 50 serves to lock the seatback pivot 20 and, in turn, the seatback 18, in the rear-entry position 42. Subsequent rearward sliding movement of the base 22 back toward and into the home position 52 of the base 22 serves to disengage the interlock actuator 50 from the blocking position 54. Moreover, movement of the seatback pivot 20 from the rear-entry position 42 to an upright position 56 serves to disengage the track overslide actuator 40.

Referring again to FIGS. 3-17, it is contemplated that the rear-access lever 32 is operable between the engaged state 36 and the idle state 34. When the rear-access lever 32 is in the idle state 34 and the track overslide actuator 40 is deactivated, the rear-access assembly 24 is disengaged from the seatback pivot 20 and the seatback pivot 20 is selectively operable between a plurality of rotational positions 26. It is also contemplated that the rear access lever is disposed in various positions proximate the vehicle seat 14. As exemplified in FIGS. 2 and 3, the rear-access lever 32 is disposed at a top portion 70 of the seatback 18. In this manner, a user of the vehicle 12 can manipulate the rear-access lever 32 toward the front 72 of the vehicle 12 such that pulling on the rear-access lever 32 helps to move the seatback 18 forward to the rear-entry position 42 to activate the track overslide actuator 40. Further pulling of the rear-access lever 32 helps to move the base 22 forward along the track 28 and beyond the plurality of comfort positions 30 and to the rear-access position 44 due to the actuation of the track overslide actuator 40.

Referring again to FIGS. 2-17, when the base 22 moves beyond the plurality of comfort positions 30, the interlock actuator 50 is activated such that the seatback 18 is locked in the rear-entry position 42 and is incapable of rotational movement out of the rear-entry position 42. Accordingly, when the user pulls, pushes, or otherwise manipulates the rear-access lever 32 and operates the vehicle seat 14 in a forward direction toward the front 72 of the vehicle 12, this single movement serves to operate the seatback 18, the base 22, the track overslide actuator 40 and the interlock actuator 50 to operate the tilt and slide mechanism 10 of the vehicle seat 14. Similarly, because the seatback 18 is locked in the rear-entry position 42 when the seat is moved fully forward to the rear-access position 44 to provide access to portions of the passenger cabin 16, the user can move the vehicle seatback 18 to the home position 52 and deactivate the track overslide actuator 40 and interlock actuators 50 through a single movement of pulling the seatback 18 in a rearward direction toward the rear 74 of the vehicle 12. The seatback 18 being in the locked position in the rear-entry position 42 when the vehicle seat 14 is moved fully forward to the rear-access position 44 provides a sturdy grasping point with which the user can manipulate the vehicle seat 14 to move the vehicle seat 14 rearward back to the home position 52.

Referring again to FIGS. 3-17, as the base 22 moves along the track 28 back to within the plurality of comfort positions 30, the interlock actuator 50 is deactivated and the seatback 18 is allowed to tilt out of the rear-entry position 42 back to an upright position 56. Once the seatback 18 moves back to the upright position 56, the track overslide actuator 40 is then deactivated to retain the vehicle seat 14 within one of the plurality of comfort positions 30 of the vehicle seat 14.

Specific operation of the rear-access lever 32, the track overslide actuator 40 and interlock actuator 50 will be described more fully below.

Referring now to FIGS. 3-17 and 22-26, the track overslide actuator 40 of the rear-access assembly 24 includes a first cam 80 that selectively engages an overslide surface 82 of the seatback pivot 20. The overslide surface 82 of the seatback pivot 20 can be an outwardly extending surface that forms part of the disc shape of the seatback pivot 20. It is contemplated that the overslide surface 82 can extend outward from the circular shape of the seatback pivot 20 or can be a shaped portion of the seatback pivot 20. When the rear-access lever 32 is moved to the engaged state 36, the first cam 80 is manipulated toward the overslide surface 82 such that the first cam 80 is disposed within the rotational path 84 of the seatback pivot 20 at the overslide surface 82.

As exemplified in FIGS. 3-7 and 22-26, when the rear-access lever 32 is in the idle state 34, the seatback pivot 20 is free to operate through the plurality of rotational positions 26 without obstruction or interference from the first cam 80 of the track overslide actuator 40. Alternatively, when the rear-access lever 32 is moved to the engaged state 36, the first cam 80 is placed in a position to selectively engage the overslide surface 82 of the seatback pivot 20, such that when the seatback pivot 20 is moved to the rear-entry position 42, the overslide surface 82 of the seatback pivot 20 moves the first cam 80 and activates the track overslide actuator 40.

Referring now to FIGS. 3-17, the track overslide actuator 40 also includes an operable stop 90 that selectively engages a comfort stop 92 defined within a portion of the track 28. When the track overslide actuator 40 is deactivated, the operable stop 90 engages the comfort stop 92 of the track 28 to define the forward-most comfort position 94. In this manner, when the operable stop 90 of the track overslide actuator 40 is deactivated, the base 22 is operable along the track 28 only between the plurality of comfort positions 30. When the overslide surface 82 of the seatback pivot 20 moves the first cam 80 to activate the track overslide actuator 40, the track overslide actuator 40 operates the operable stop 90 to an avoidance position 96. In the avoidance position 96, the operable stop 90 is moved to a configuration such that the operable stop 90 selectively bypasses the comfort stop 92 and allows the base 22 to move in sliding operation beyond the plurality of comfort positions 30 and into any one of the plurality of non-seating positions 98, including the rear-access position 44 of the base 22 of the vehicle seat 14.

Referring again to FIGS. 3-17 and 22-26, after the rear-access lever 32 is moved to the engaged state 36 and the first cam 80 is moved into the path of the first overslide surface 82 of the seatback pivot 20, operation of the seatback pivot 20 toward the rear-entry position 42 also moves the rear-access lever 32 back to the idle state 34. Accordingly, the rear-access lever 32, in the idle state 34, is moved back to its original loaded position 110 and prepared to place the rear-access assembly 24 in the ready position 38 once the vehicle seat 14 is moved back into the home position 52. It is contemplated that reloading of the rear-access lever 32 can occur at various stages of the movement of the vehicle seat 14 as the vehicle seat 14 moves toward the rear-entry position 42 of the vehicle seat 14. In the illustrated embodiment, because the rear-access lever 32 is moved back to the loaded position 110 at the initial stages of the movement of the seatback 18 from the upright position 56 toward the rear-entry position 42, a user can immediately move the seatback 18 to the upright position 56 if it becomes unnecessary to fully perform the various operations of the rear-access assembly 24.

According to the various embodiments, it is contemplated that movement of the rear-access lever 32 from the idle state 34 to the engaged state 36 serves to disengage a recline mechanism 112 of the seatback pivot 20. Accordingly, the ready position 38 of the rear-access assembly 24 defines a disengagement of the recline mechanism 112 so that the seatback pivot 20 can be rotated forward to the rear-entry position 42. When the seatback pivot 20 is moved back to the upright position 56, the recline mechanism 112 is re-engaged for operation to manipulate the seatback pivot 20 between the plurality of rotational positions 26.

Referring again to FIGS. 4-17, in various embodiments of the device, the track overslide actuator 40 is positioned in two locations within the vehicle seat 14. The first is the first cam 80 which is placed proximate the seatback pivot 20. The second is the operable stop 90 placed proximate the track 28 of the vehicle seat 14. These two components of the track overslide actuator 40 can be connected through a first linkage 120. The first linkage 120 can be one of various linkages that can include, but are not limited to, cables, chains, wires, pneumatic mechanisms, hydraulic mechanisms, various motors, combinations thereof, and other similar linkages. Because these portions of the track overslide actuator 40 are separated, various rotational movements of the first cam 80 and the operable stop 90 of the track overslide actuator 40 have a relatively short radial length, such that a minimal amount of force is necessary to operate the first cam 80 and the operable stop 90. Additionally, various biasing mechanisms can be included within the track overslide actuator 40 to further assist in the various movements of the first cam 80 and the operable stop 90. To further assist in these movements, the rear-access lever 32 is placed at the top portion 70 of the seatback 18 such that the entire length of the seatback 18 serves as a lever for rotating the seatback pivot 20 to and from the rear-entry position 42 for engaging and disengaging the track overslide actuator 40.

Referring now to FIGS. 18-21, the operable stop 90 of the track overslide actuator 40 can include a biasing mechanism that serves to bias the operable stop 90 into a stopping position 130 such that the resting state 132 of the operable stop 90 is one that limits the movement of the vehicle seat 14 to the plurality of comfort positions 30 along the track 28. When the track overslide actuator 40 is activated, an overslide actuator assembly 134 engages the operable stop 90 to move the operable stop 90 into the avoidance position 96 such that the base 22 can move beyond the plurality of comfort positions 30 and to the non-seating positions 98. Within the overslide actuator assembly 134, a secondary regulating surface 136 can engage a regulating mechanism 138 to control the movement of the operable stop 90 as it moves between the stopping position 130 and the avoidance position 96. This regulating mechanism 138 can be a damper 140 and can serve to limit the amount of vibration and noise emanating from the operable stop 90 as the track overslide actuator 40 is activated and deactivated. The damper 140 and various biasing mechanisms can also cooperate to move the operable stop 90 back to the stopping position 130 after the track overslide actuator 40 is deactivated. It is also contemplated that the various dampers 140 and other regulating mechanisms 138 of the overslide actuator assembly 134 can serve to activate and deactivate various mechanical and electrical functions and indicators that are related to the movement of the vehicle seat 14 during operation of the tilt and slide mechanism 10 of the vehicle seat 14.

Referring again to FIGS. 3-17 and 22-26, the interlock actuator 50 of the rear-access assembly 24 can include a second cam 150 that selectively and directly engages an interlock surface 152 of the seatback pivot 20. The interlock surface 152 of the seatback pivot 20 can be a distinct portion of the seatback pivot 20 that is separate from the overslide surface 82 of the seatback pivot 20. When the interlock actuator 50 is activated, the interlock surface 152 at least partially surrounds the second cam 150 to define the blocking position 54 of the second cam 150 that retains the seatback pivot 20 in the rear-entry position 42 and prevents all rotational movement of the seatback 18 out of the rear-entry position 42 until such time as the interlock actuator 50 is deactivated. According to the various embodiments, it is contemplated that the rear-entry position 42 of the seatback 18 defines a substantially inaccessible state 154 of the vehicle seat 14. Accordingly, as the seatback 18 moves to the rear-entry position 42, a user would be substantially prevented from sitting in the vehicle seat 14 during operation of the tilt and slide mechanism 10.

Referring again to FIGS. 3-21, the interlock actuator 50 can include an interlock ledge 160 that is defined within a portion of the track 28. The interlock ledge 160 serves to selectively engage a track portion 162 of the interlock actuator 50. When the track overslide actuator 40 is engaged and the base 22 slides along the track 28, the track portion 162 can, at a certain point along the movement of the base 22 along the track 28, become disengaged with the interlock ledge 160. This disengagement of the track portion 162 from the interlock ledge 160 serves to place the second cam 150 in the blocking position 54. As exemplified in FIGS. 4-17, the track portion 162 rotates downward as it disengages the interlock ledge 160. This downward rotation, in turn, results in rotation of the second cam 150 into the blocking position 54. As the vehicle seat 14 moves back to the home position 52, re-engagement of the track portion 162 of the interlock actuator 50 with the interlock ledge 160 rotates the track portion 162 upward and, in turn, moves the second cam 150 out of the blocking position 54 and serves to define the at least partial rotation of the seatback 18 from the rear-entry position 42 and toward the upright position 56.

Referring again to FIGS. 3-21, the interlock actuator 50, similar to the track overslide actuator 40, is split into at least two portions. As discussed above, the second cam 150 is positioned proximate the seatback pivot 20 and the track portion 162 of the interlock actuator 50 is disposed proximate the track 28. These two portions of the interlock actuator 50 are connected through a second linkage 170 similar to those provided between the first cam 80 and the operable stop 90 of the track overslide actuator 40, as discussed above. Additionally, while operation of the track overslide actuator 40 is based upon a rotational movement of the seatback pivot 20 that is transferred from the seatback pivot 20 to the operable step, operation of the interlock actuator 50 is provided through lateral manipulation of the base 22 sliding along the track 28 that is transferred from the track 28 and to the seatback pivot 20. Accordingly, the track portion 162 of the interlock actuator 50 engages and disengages the interlock ledge 160 to operate the second cam 150 in and out of the blocking position 54 to selectively fix the rotational position 26 of the seatback 18 in the rear-entry position 42.

Figure 22:
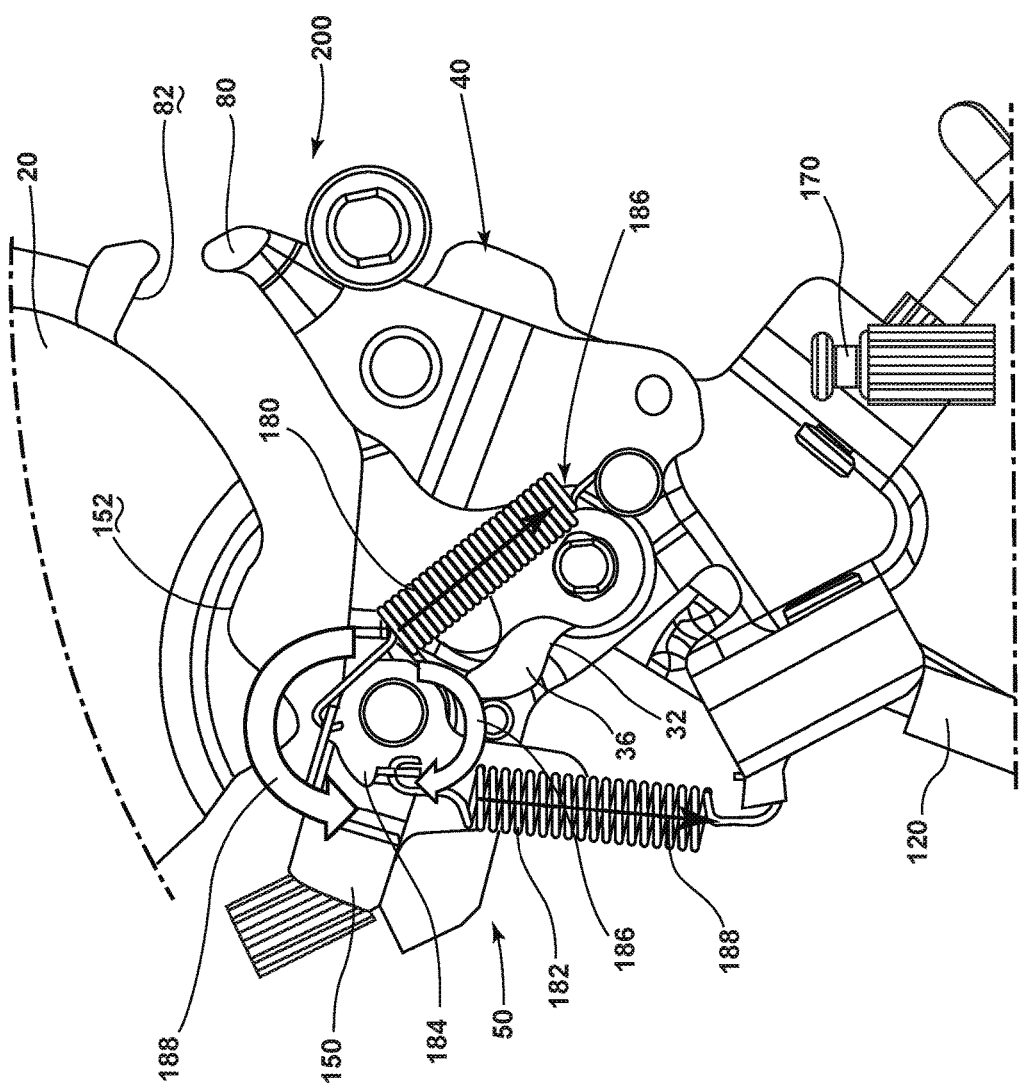
FIG. 22 is an enlarged detail view of the first and second cams in a deactivated state of the rear-access assembly.
Figure 23:
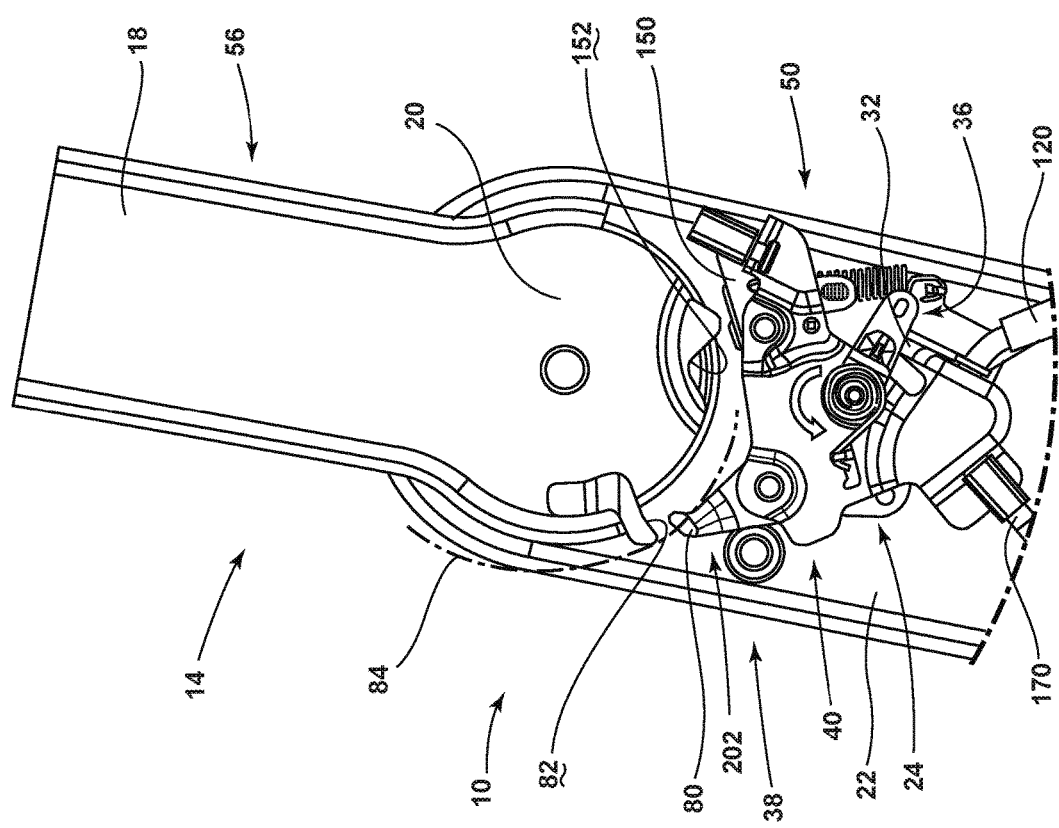
FIG. 23 is an enlarged elevational view of the seatback pivot of FIG. 21 with the first cam in an obstructing position.
Figure 24:
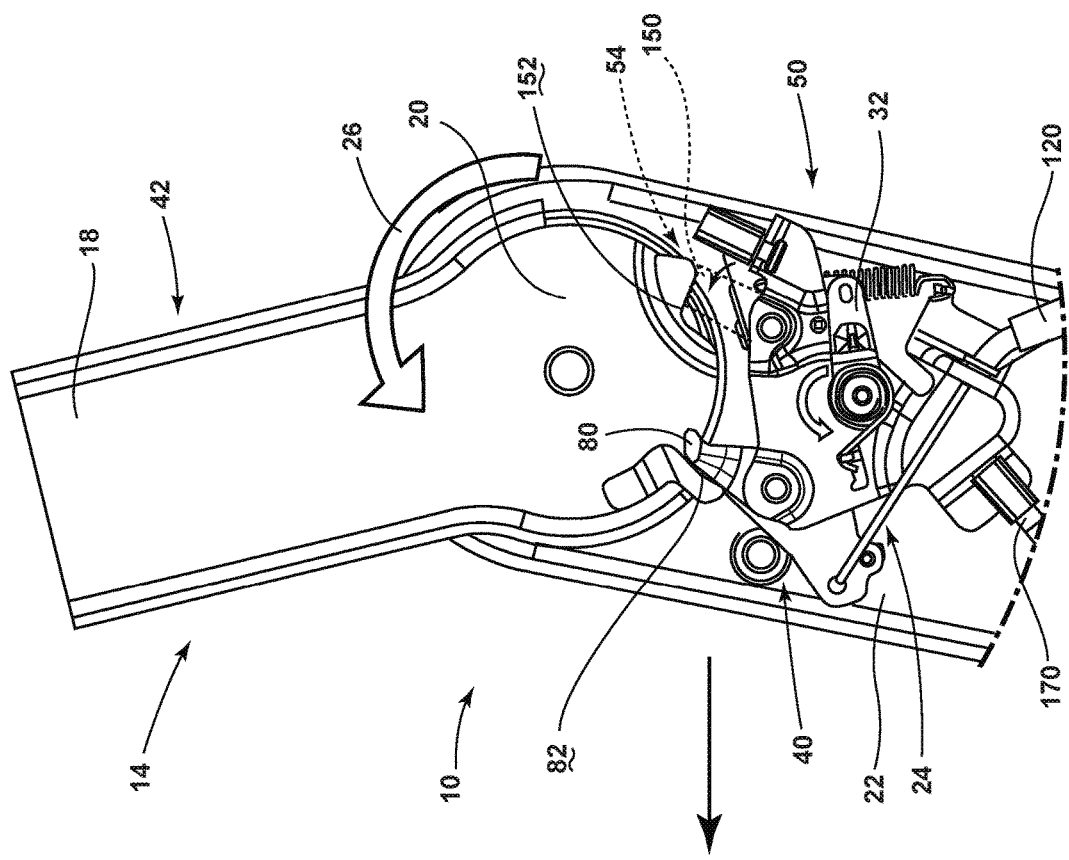
FIG. 24 is an enlarged elevational view of the seatback pivot of FIG. 23 with the seatback in the rear-entry position.
Figure 25:
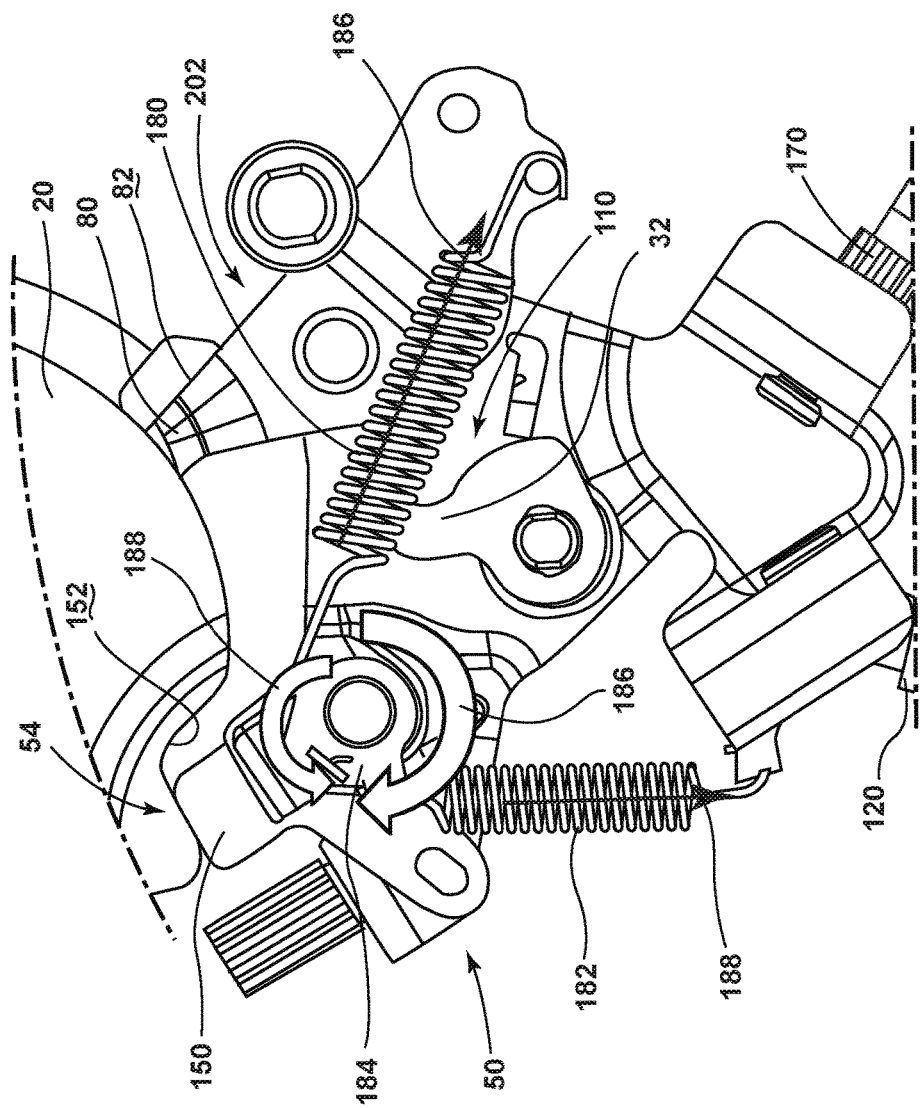
FIG. 25 is an enlarged detail view of the first and second cams of FIG. 22 with the second cam in the blocking position.

Referring again to FIGS. 22-26, the second cam 150 of the interlock actuator 50, as well as the track portion 162 of the interlock actuator 50, can include various biasing mechanisms to assist in their operation during movement of the base 22 along the track 28 to define the plurality of comfort positions 30 and also the various non-seating positions 98 beyond the comfort positions 30 that define the tilt and slide mechanism 10. It is also contemplated that these various biasing mechanisms can operate in conjunction with the various biasing mechanisms of the track overslide actuator 40. By way of example, but not limitation, first and second springs 180, 182 can be coupled to a cam spring bracket 184 that is positioned between the first and second cams 80, 150. When the rear-access assembly 24 is deactivated, these first and second springs 180, 182 operate to maintain the first and second cams 80, 150 in a position separated or at least disengaged, with the seatback pivot 20 (FIGS. 22 and 23). During operation of the seatback pivot 20 to the rear-access position 44 to manipulate the first cam 80, the first cam 80 can extend the first spring 180 thereby pulling against the cam spring bracket 184. In this manner, the biasing force exerted by the first spring 180 serves to exert a first biasing force 186 against the second cam 150 in the direction of the blocking position 54. When the base 22 is slidably operated along the track 28 to disengage the track portion 162 of the interlock actuator 50 from the interlock ledge 160, the biasing force exerted by the first spring 180 assists in the operation of the second cam 150 into the blocking position 54 and in engagement with the interlock surface 152 of the seatback pivot 20. The second spring 182 that is coupled to the cam spring bracket 184 then exerts an opposing second biasing force 188 on the second cam 150 to assist in the movement of the second cam 150 out of the blocking position 54 when the track portion 162 of the interlock actuator 50 engages with the interlock ledge 160, defined within a portion of the track 28. In this manner, the first and second springs 180, 182 can be used in conjunction to assist in operation of the first and second cams 80, 150 to minimize the amount of force necessary to manipulate the various components of the rear-access assembly 24. It is contemplated that the first and second springs 180, 182 can be tuned such that the second biasing force 188 of the second spring 182 is only slightly larger than the first biasing force 186 of the first spring 180 in order to maintain the second cam 150 out of the blocking position 54 when the rear-access assembly 24 is deactivated.

Referring again to FIGS. 3-26, according to the various embodiments, the vehicle seat 14 can include the seatback pivot 20 that rotationally operates relative to a slidable base 22. The first cam 80 is adapted to be in communication with the seatback pivot 20 to activate the track overslide actuator 40 at least partially coupled to the base 22 when the seatback pivot 20 is in the rear-entry position 42. The second cam 150 is adapted to be in communication with the seatback pivot 20. When the track overslide actuator 40 is activated, forward operation of the base 22 along the track 28 serves to operate the second cam 150 to lock the seatback pivot 20 in the rear-entry position 42. As discussed above, the slidable base 22 engages the track 28 and defines the plurality of comfort positions 30 of the slidable base 22 when the track overslide actuator 40 is deactivated. The track 28 further defines a forward slidable movement of the slidable base 22 beyond the plurality of comfort positions 30 to the non-seating positions 98 and the rear-access position 44 when the track overslide actuator 40 is activated.

Referring again to FIGS. 22-26, the rear-access lever 32 is adapted to selectively operate the first cam 80 from a clearance position 200, wherein the seatback pivot 20 rotates freely relative to the first cam 80 to an obstructing position 202. In the obstructing position 202, the first cam 80 intersects the rotational path 84 of the seatback pivot 20, such that rotation of the seatback pivot 20 to the rear-entry position 42 activates the track overslide actuator 40.

Referring again to FIGS. 3-21, the rear-access assembly 24, which is part of a pivot assembly for the vehicle seat 14 includes a seatback pivot 20 in communication with a seat-base slide or track 28 of the vehicle seat 14. Rotation of the seatback pivot 20 to a rear-entry position 42 serves to selectively activate an overslide cam, corresponding to the first cam 80, which defines an overslide state 210 of the seat-base slide of the vehicle seat 14 that includes the avoidance position 96 of the operable step. The seat-base slide of the vehicle seat 14 can typically correspond to the track overslide actuator 40. Additionally, forward translation of the seatback pivot 20 in the rear-entry position 42 relative to the seat-base slide serves to activate an interlock cam, typically defined by the second cam 150 that retains the seatback pivot 20 in the rear-entry position 42. In such an embodiment, it is contemplated that the forward translation of the seatback pivot 20 while in the rear-entry position 42 relative to the seat-base slide corresponds to the sliding movement of the base 22 along the track 28 to define the comfort positions 30 and the various non-seating positions 98 of the base 22 beyond the comfort positions 30 for defining the rear-access position 44 of the rear-access assembly 24. As discussed above, the first cam 80 is operable from the clearance position 200 to the obstructed position through operation of the rear-access lever 32. The clearance position 200 is defined by operation of the seatback pivot 20 in a manner free of engagement or otherwise being obstructed by the first cam 80. The obstructing position 202 is defined by the first cam 80 being in the rotational path 84 of the overslide surface 82 of the seatback pivot 20. It is also contemplated that the movement of the first cam 80 back to the clearance position 200 is achieved when the seatback 18 is moved back to the upright position 56 such that the overslide surface 82 disengages with the first cam 80 and the first cam 80 passes by the overslide surface 82 to be biased back into the clearance position 200.

Referring again to FIGS. 22-26, the second cam 150 is operable between an offset position 212 where the seatback pivot 20 freely rotates relative to the first cam 80, and a blocking position 54 where the interlock cam engages the interlock surface 152 of the seatback pivot 20. When the first cam 80 is in the offset position 212, it is contemplated that the first cam 80 can either slide along the outer edge 214 of the seatback pivot 20, or can be positioned distal from the outer edge 214 of the seatback pivot 20. As discussed above, when the second cam 150 is in engagement with the interlock surface 152 of the seatback pivot 20, the interlock surface 152 at least partially surrounds the second cam 150 such that the seatback pivot 20 is locked in position and is free of rotating out of the rear-entry position 42. It is contemplated that the interlock surface 152 of the seatback pivot 20 is only in engagement with the second cam 150, to receive the second cam 150 in the blocking position 54, when the seatback 18 is in the rear-entry position 42.

Referring again to FIGS. 3-26, after the vehicle seat 14 is moved to the rear-access position 44, being one of the non-seating positions 98 of the vehicle seat 14, the rearward translation of the seatback pivot 20 from an overslide state 210 of the seat-base slide, also defined as the track portion 162 of the interlock actuator 50, coming into engagement with the interlock ledge 160, the seat-base slide disengages the second cam 150 from the seatback pivot 20 to define selective operation of the seatback pivot 20 from the rear-entry position 42 to the upright position 56. Additionally, operation of the seatback pivot 20 from the rear-entry position 42 to the upright position 56 serves to disengage the first cam 80 from the seatback pivot 20 to define rotation of the seatback pivot 20 between the plurality of rotational positions 26 and in a manner free of obstruction from the first and second cams 80, 150.

Referring again to FIG. 1, it is contemplated that the rear-access assembly 24 described herein can be used in any one of various seats that can include, but are not limited to, front row seats 230, middle row seats 232, Captain's chair-style seating, bench-style seating, permanently affixed seating, removable seating, and seating within the various vehicles 12 that can include, but is not limited to, cars, SUVs, CUVs, trucks, vans, combinations thereof, other transportation vehicles, mass transit vehicles, as well as others.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
   a seatback having a pivot rotationally coupled to a base that is slidable along a track between a plurality of comfort positions;
   a track-overslide actuator in communication with the pivot and the track, wherein operation of the pivot to a rear-entry position activates the track-overslide actuator to provide slidable forward operation of the base along the track beyond the plurality of comfort positions wherein the track-overslide actuator includes an overslide cam that directly engages an overslide surface of the pivot; and
   an interlock actuator in communication with the pivot and the track, wherein when the track-overslide actuator is activated, forward operation of the base along the track activates the interlock actuator into a blocking position to lock the pivot in the rear-entry position, wherein rearward sliding movement of the base back to the plurality of comfort positions disengages the interlock actuator from the blocking position and movement of the pivot to an upright position disengages the track-overslide actuator, wherein the interlock actuator includes an interlock cam that directly engages an interlock surface of the pivot, wherein a first spring extends between the overslide and interlock cams to bias the interlock cam toward the blocking position, and wherein a second spring biases the interlock cam away from the blocking position.

2. The vehicle seat of claim 1, wherein the first and second springs attach to the interlock cam at a cam spring bracket that is coupled to the interlock cam.

3. The vehicle seat of claim 2, wherein the first spring exerts a first biasing force against the interlock cam and the second spring exerts a second biasing force against the interlock cam.

4. The vehicle seat of claim 3, wherein the second biasing force is greater than the first biasing force when the track-overslide actuator is deactivated, and wherein the first biasing force is greater than the second biasing force when the track-overslide actuator is activated and the base is within the plurality of comfort positions.

5. The vehicle seat of claim 4, wherein the second biasing force is greater than the first biasing force when the base is outside of the plurality of comfort positions.

6. A vehicle seat comprising:
   a pivot rotationally operable relative to a slidable base;
   an overslide cam in communication with the pivot to bias an interlock cam toward the pivot when the pivot is in a rear-entry position;
      a track-overslide actuator that cooperates with the overslide cam to engage the interlock cam with the pivot and lock the pivot in the rear-entry position upon forward operation of the slidable base;
   a first spring that extends between the overslide cam and the interlock cam to bias the interlock cam into engagement with the pivot; and
   a second spring coupled with the interlock cam that biases the interlock cam to an offset position that is distal from the pivot.

7. The vehicle seat of claim 6, wherein a first biasing force of the first spring overcomes a second biasing force of the second spring when the pivot is moved to the rear-entry position.

8. The vehicle seat of claim 7, wherein the second biasing force of the second spring overcomes the first biasing force of the first spring when the pivot is in an upright position that is indicative of a clearance position of the overslide cam.

9. The vehicle seat of claim 6, further comprising:
   a rear-access lever that selectively operates the overslide cam from a clearance position wherein the pivot rotates freely relative to the overslide cam to an obstructing position wherein the overslide cam intersects a rotational path of the pivot such that rotation of the pivot to the rear-entry position activates the track-overslide actuator.

10. The vehicle seat of claim 9, wherein the pivot defines an overslide surface that engages the overslide cam in the obstructing position, and wherein the pivot defines an interlock surface that selectively engages the interlock cam, wherein the interlock surface at least partially surrounds the interlock cam to secure the pivot in the rear-entry position.

11. The vehicle seat of claim 6, wherein the slidable base engages a track that defines a plurality of comfort positions of the slidable base when the track-overslide actuator is deactivated, and wherein the track further defines a forward slidable movement of the slidable base beyond the plurality of comfort positions when the track-overslide actuator is activated.

12. The vehicle seat of claim 11, wherein rearward movement of the slidable base from beyond the plurality of comfort positions to at least one of the plurality of comfort positions disengages the interlock cam from the pivot, wherein disengagement of the interlock cam defines at least partial rotation of the pivot from the rear-entry position to an upright position of the pivot, and wherein movement of the pivot from the rear-entry position to the upright position disengages the overslide cam from the pivot to define operation of the pivot between a plurality of rotational positions free of obstruction from the overslide cam.

13. The vehicle seat of claim 12, further comprising:
   a comfort stop of the track-overslide actuator that defines a forward-most comfort position of the slidable base; and
   an operable stop of the track-overslide actuator, wherein when the track-overslide actuator is deactivated, the comfort stop engages the operable stop to define the forward-most comfort position, and wherein activation of the track-overslide actuator operates the operable stop to an avoidance position wherein the operable stop selectively bypasses the comfort stop to define sliding operation of the slidable base beyond the plurality of comfort positions to define a rear-access position.

14. The vehicle seat of claim 12, wherein the interlock cam is in communication with an interlock actuator, the interlock actuator having an interlock ledge that selectively engages a track portion of the interlock actuator, wherein when the track-overslide actuator is engaged, disengagement of the track portion from the interlock ledge places the interlock cam into direct engagement with the pivot to define a blocking opposition of the pivot wherein the pivot is locked in the rear-entry position, and wherein engagement of the track portion with the interlock ledge disengages the interlock cam from the pivot to define at least partial rotational operation of the pivot.

15. A vehicle seat comprising:
   a seatback having a pivot in communication with a seat-base slide;
   a first spring extending between an interlock cam and an overslide cam that exerts a first biasing force against the interlock cam toward engagement with the pivot;
   a second spring that exerts a second biasing force to bias the interlock cam away from the pivot and toward an offset position; wherein:
      the second biasing force is greater than the first biasing force when the seatback is in an upright position indicative of a deactivated state of the overslide cam;
      the first biasing force is greater than the second biasing force when the seatback is rotated to a rear-entry position; and
      the second biasing force is greater than the first biasing force when the seatback in the rear-entry position is disposed in an overslide position in relation to the seat-base slide.

16. The vehicle seat of claim 15, wherein the overslide cam is operable between a clearance position and an obstructing position, the clearance position defined by operation of the pivot being free of engagement with the overslide cam, and the obstructing position defined by the overslide cam being in a rotational path of an overslide surface of the pivot.

17. The vehicle seat of claim 16, wherein a rear-access lever operates the overslide cam from the clearance position to the obstructing position.

18. The vehicle seat of claim 16, wherein rearward translation of the pivot from an overslide state of the seat-base slide to a comfort position of the seat-base slide disengages the interlock cam from the pivot to define selective operation of the pivot from the rear-entry position to the upright position.

19. The vehicle seat of claim 18, wherein operation of the pivot from the rear-entry position to the upright position disengages the overslide cam from the pivot to define rotation of the pivot between a plurality of rotational positions free of obstruction from the overslide and interlock cams.

* * * * *